June 30, 1970  F. L. McCLASKEY  3,517,621
CARGO CONTAINER LOCKING ASSEMBLY
Filed Sept. 12, 1968  2 Sheets-Sheet 1
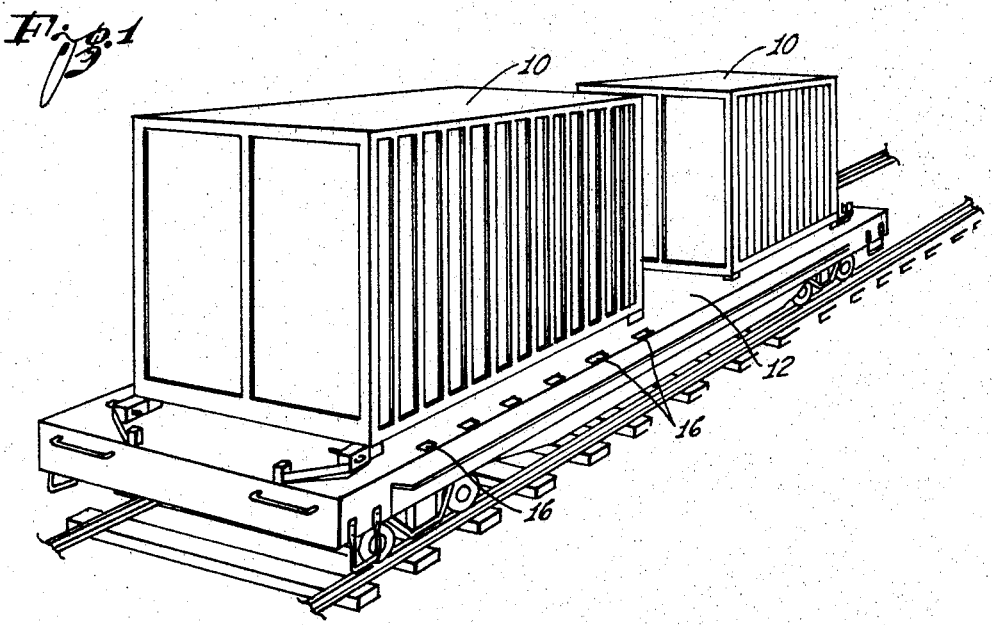
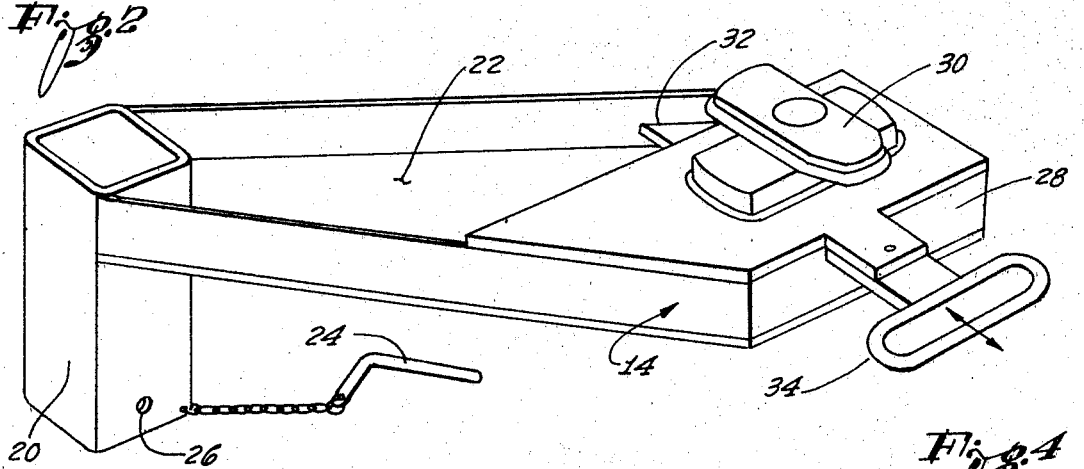
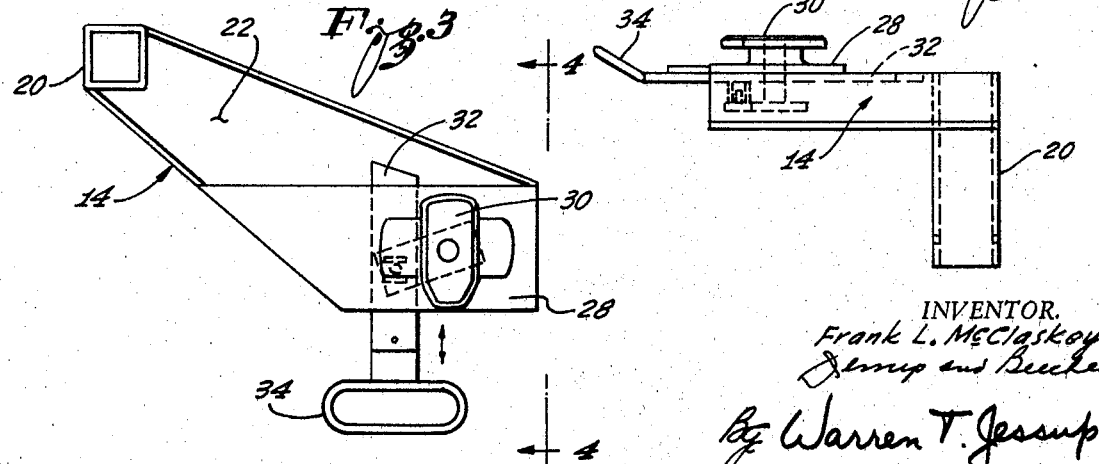
INVENTOR.
Frank L. McClaskey
Jessup and Beecher
By Warren T. Jessup
ATTORNEYS June 30, 1970  F. L. McCLASKEY  3,517,621
CARGO CONTAINER LOCKING ASSEMBLY
Filed Sept. 12, 1968  2 Sheets-Sheet 2
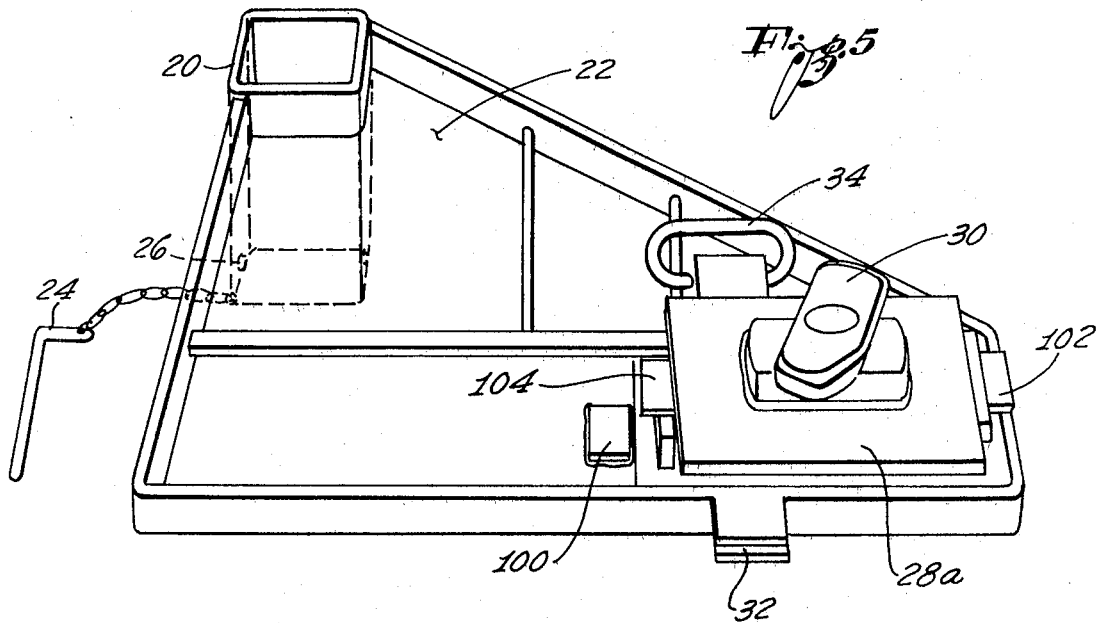
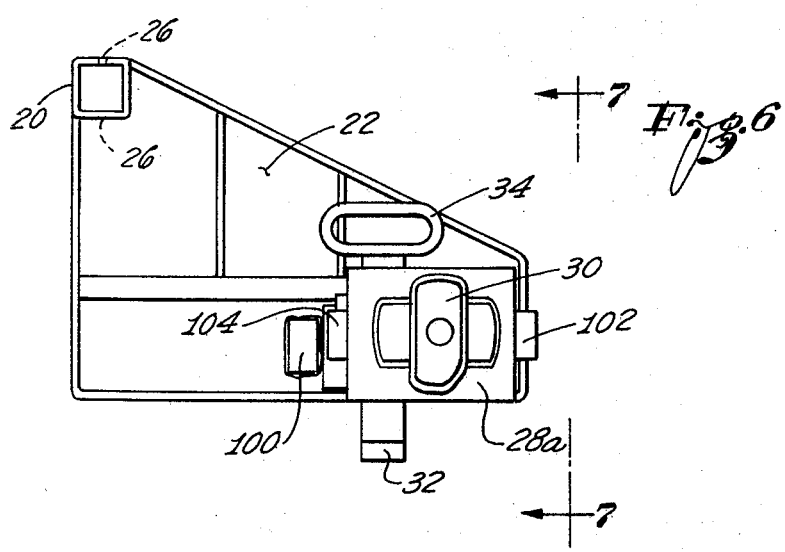
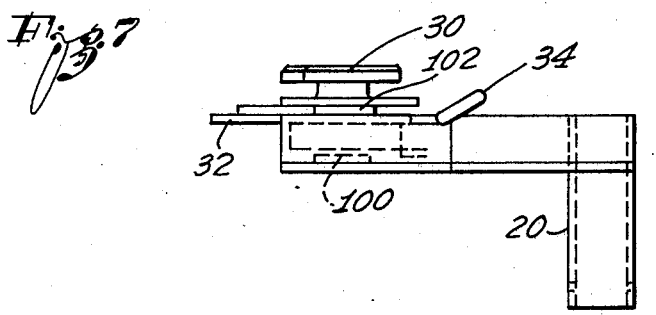
INVENTOR.
Frank L. McClaskey
Jessup and Beecher
By Warren T. Jessup
ATTORNEYS

United States Patent Office 3,517,621
Patented June 30, 1970

3,517,621
CARGO CONTAINER LOCKING ASSEMBLY
Frank L. McClaskey, 440 Banning Blvd.,
Wilmington, Calif. 90744
Continuation-in-part of application Ser. No. 656,823,
July 28, 1967. This application Sept. 12, 1968, Ser.
No. 759,338
Int. Cl. B65j 1/22; B60p 7/18
U.S. Cl. 105—366                    7 Claims

ABSTRACT OF THE DISCLOSURE

An improved attachment assembly for locking large size heavy cargo containers on the deck of a flat car, box car, truck, trailer, or the like, is provided. The use of the improved attachment assembly of the invention obviates any need for straps, chains, blocks, or other means to position or hold the cargo containers securely in place on the deck of the vehicle. The locking attachment of the invention is in the form of a unit which fits into the stake pockets of a flat car, or equivalent apertures in other vehicles. These stake pockets are usually in the form of rectangular holes, and extend as a series down each side of the flat car for receiving stakes which, in turn, support sides for the flat car. In the practice of the invention, for example, a separate attachment unit is provided at each corner of the cargo container to be supported thereon. The cargo container is then lowered into place over the four units, and the units have respective heads which may be locked into pockets on the under side of the cargo container, securely to hold the cargo container in place on the deck of the vehicle.

BACKGROUND OF THE INVENTION

This application is a continuation-in-part of copending application Ser. No. 656,823, filed July 28, 1967, in the name of the present inventor, which has now been abandoned.

The use of cargo containers in ships, trucks, railroad cars, and the like, is becoming more and more prevalent. At the present, for example, cargo ships in the Pacific Ocean are carrying over 450 of such containers each. It is also expected that ships capable of carrying 900 cargo containers, and more, will be available in the near future. The cargo container sizes correspond in width to the usual railroad flat car, and they are available in various lengths of, for example, 10, 20, 30 or 40 feet. Attempts are being made at present to standardize the length of such cargo containers at 20, 30 and 40 feet.

The present practice is to load the cargo containers from the ships into flat cars, on which they are transported to selected distribution centers. The cargo containers are then loaded onto trucks or trailers at the distribution centers to be hauled to their final destination. The containers may be ultimately unloaded from the flat cars, or other vehicles, by lift forks, or they may be loaded in such a manner that the lift fork truck may proceed directly onto the vehicle and into the container to unload the load from the interior of the container.

Securing the aforeesaid cargo containers to the deck of the flat cars, trailers or other vehicle has long been a problem. Care must be taken to assure that the containers are lashed securely in place, and in a manner such that they will remain secure throughout the haul. In the past, this was achieved by the use of blocks, straps and chains, all of which necessitated specially designed vehicles with permanent anchors. Loading and unloading the cargo containers which were secured to the carrying vehicle in accordance with the prior art practices was a time consuming operation, as the various anchors, straps and chains had to be secured in place during the loading of the cargo containers, and subsequently removed when the cargo containers were unloaded from the vehicle. Moreover, even during the haul, frequent stops had to be made to check and tighten the straps and chains.

As mentioned above, the present invention provides a simple locking attachment unit. The unit of the invention serves to secure the cargo containers to the deck of the flat car, or other vehicle. This is achieved without any need for blocks, straps, chains, or other bindings. The attachment units of the invention may be placed quickly and securely in any standard flat car, for example, merely by inserting them in selected ones of the stake pockets which run along each side of the flat car. A locking pin may be used to hold the individual units securely in the corresponding stake pockets.

The cargo container is then lowered down onto the attachment units on the deck of the vehicle, until the respective heads of the individual attachment units are received in corresponding pockets on the under side of the cargo container. A control arm on each attachment unit is then actuated to turn the heads and lock the cargo container in place on the vehicle.

Loading and unloading of the cargo containers, when the attachment units of the present invention are used, can be accomplished in two or three minutes. As mentioned, with the attachment units of the present invention, there is no need for specially designed flat cars, or other specially designed vehicles, and the cargo containers are securely held on the deck of the ordinary flat car, trailer, truck or the like, without any need for blocking or strapping, and with no alteration required to the structure of the actual vehicle.

As will be described, steel plates, steel tubular stock, and steel bar stock of various thicknesses may be used in the construction of the units of the invention. The various components which make up the attachment units of the invention may be secured together into an integral assembly, for example, by welding. The attachment unit of the invention includes, for example, an elongated post member which may be hollow, and which may have a square or rectangular cross section. The post member is received in a selected stake pocket of similar dimensions in the deck of the vehicle. The post is preferably held within the stake pocket in a manner such that it cannot be turned. Also, it may be locked against linear vertical movement therein by means of a locking pin.

After the cargo container has been lowered into place onto the vehicle over the attachment units of the invention, it is secured to the deck of the vehicle, merely by the actuation of the sliding lock mechanism in each attachment unit, as will be described. As mentioned above, the locking mechanisms cause the heads of the attachment units to turn, for example, to 180° into a latched, or locked, position with respect to corresponding pockets in the bottom or under side of the cargo container.

SUMMARY OF THE INVENTION

The invention provides an attachment unit for railway cars, motor trucks, trailers, and the like, for holding a cargo container thereon against shifting, and for facilitating the loading and removal of the cargo container on the vehicle. The attachment units of the invention are mounted at predetermined selected positions on the deck of the railway car, or the like, by means of a post which protrudes down from a central web-like member of the attachment unit into a stake pocket, or similar receptacle, in the vehicle. The attachment unit of the invention includes a head member which extends up from the central web-like member, and which is received in a pocket in the under side of the cargo container. The head member, as mentioned above, may be subsequently turned and locked to the container, so that the container is effectively secured to the deck of the vehicle. The attachment unit of the invention is effective, for example, in preventing lateral and longitudinal shifting of the container. In one embodiment of the invention to be described, the head may be adjustable transversely to various longitudinal positions, so as to assist in aligning it with the pockets in the corners of the under side of a cargo container to be secured thereby.

BRIEF DESCRIPTION OF THE DRAWINGS

FIG. 1 shows various cargo containers supported on a flat car and utilizing, for example, the attached unit of the present invention;

FIG. 2 is a perspective view of one embodiment of the attachment assembly of the invention;

FIG. 3 is a plan view of the embodiment of FIG. 2 on a reduced scale;

FIG. 4 is a side elevation of the attachment unit of FIGS. 2 and 3 on essentially the same scale as FIG. 2.;

FIG. 5 is a perspective view of a second embodiment of the attachment unit of the invention;

FIG. 6 is a plan view of the embodiment of FIG. 5 on a reduced scale; and

FIG. 7 is a side elevation of the attachment unit of FIGS. 5 and 6 on essentially the same scale as FIG. 6.

DETAILED DESCRIPTION OF THE ILLUSTRATED EMBODIMENT

As shown in FIG. 1, for example, a plurality of cargo containers 10 may be supported on the deck of a flat car 12, by means of attachment units 14, which may be constructed in accordance with the concepts of the present invention. Although one attachment unit 14 is shown in FIG. 1, it will be appreciated that a separate unit may be used at each corner of the cargo container 10, so as to support the cargo container on the deck of the flat car.

The cargo containers 10 are preferably supported in a spaced position along the flat car, as shown, so as to permit a fork lift truck, or the like to move onto the flat car and into the individual containers and remove the contents from the interior thereof, when so desired.

As shown in FIG. 1, the flat car includes a plurality of stake pockets 16, or equivalent receptacles, extending along both sides of the car and across the ends. These stake pockets are used to receive the posts 20 (FIG. 2) of the attachment units of the present invention, so that each attachment may be properly positioned and held on the deck of the flat car.

As shown in FIG. 2, for example, the attachment unit 14 includes a central web-like member 22 which is intended to be supported on the deck of the flat car, or equivalent vehicle, as the post 20 is received in an adjacent stake pocket in the vehicle. In the illustrated embodiments, the post 20 has a rectangular hollow configuration, to be received in the rectangular stake pockets, which hold the post 20 and the other components of the attachment unit 14 without turning. The post 20 may be secured within the particular stake pocket against vertical movement therein by means of a pin 24 which serves as a locking pin, and which is inserted through a hole in the side of a stake pocket and through aligned holes such as the hole 26 in the post 20.

The post 20 is attached to one end of the web-like member 22 in the embodiment of FIG. 2, and a support bracket 28 is mounted on the other end of the web. The members 20, 22 and 28, as mentioned above, may be composed of steel, or other appropriate rigid and strong material, and they may be welded together into a unitary assembly.

A head 30 is rotatably mounted on the top of the support bracket 28, and this head is coupled to an actuating arm 32. The arm 32 is slidable in the bracket 28, and is linked with the head 30, such that movement of the arm 32 in and out with respect to the bracket 28 causes the head 30 to turn from one position to another through, for example, 90°. The head 30 has a rectangular shape, and is preferably tapered towards the top, as shown. The head is received in a corresponding pocket in the under side of the cargo container. When it is turned to a first position, it is received in the pocket of the cargo container. Then, when it is turned to a second position by pulling the ring 34 attached to the arm 32, the head is securely locked within the pocket in the bottom of the cargo container, so that the cargo container is rigidly and securely supported on the attachment unit.

In the embodiment of FIGS. 2, 3 and 4, for example, the bracket 28 is fixed to the web-like member 22. However, in the embodiment of FIGS. 5-7, the bracket designated 28a is movable along the web-like member 22 to provide a measure of longitudinal adjustment for the head 30, so that it may be properly aligned with the pockets in the container to be supported thereby. A limiting stop 100 at one end of the bracket, and a limiting stop 102 at the other end hold the bracket 28a in place. However, a gate 104 may be raised to permit the bracket 28a to be moved to the other side of the stop 10, so as to be supported in other preset positions along the web.

As mentioned above, when the attachment unit illustrated in FIGS. 2-4 or FIGS. 5-7, is used in conjunction with a cargo container 10 such as shown in FIG. 1; the cargo container may be rigidly and securely supported on the deck of the vehicle, and no blocking, strapping or any alterations to the vehicle are required. It will be appreciated that the bracket such as shown in FIGS. 2-4 may be used in conjunction with the bracket shown in FIGS. 5-7, so that one or all of the attachments may be adjustable, depending upon the dimensions of the cargo container.

When the improved attachment unit is used, any flat bed trailer or flat car may be used, thereby eliminating the need for special cars or chassis. In addition, any length container may be accommodated due to the multiple stake pockets in the flat car and to the adjustable feature of the embodiment of FIGS. 5-7.

While particular embodiments of the invention have been shown and described, modifications may be made, and it is intended in the claims to cover all the modifications which come within the scope of the invention.

What is claimed is:

1. An attachment unit for securing a cargo container, and the like, on the deck of a vehicle, said deck of said vehicle being provided with a plurality of receptacles therein, said attachment unit including a web-like member resting on said deck and disposed parallel to the plane thereof when the unit is in position on said vehicle, an elongated post member attached to said web-like member and extending down from the plane of said web-like member to be received in one of said receptacles in the aforesaid deck of said vehicle, a pair of spaced and parallel guides on the upper surface of said web-like member and extending transversely thereacross, a bracket positioned on the upper surface of said web-like member between said guides to be movable across said upper surface of said web-like member to a plurality of positions thereon, a head member rotatably supported on said bracket and protruding up from the plane thereof in the opposite direction to said post member to be received in a pocket in the underside of said cargo container; and an actuating means mounted on said bracket and coupled to said head member to rotate said head member between a first angular position in which it may be inserted into said pocket in said cargo container and a second angular position in which it is locked in said last-named pocket.

2. The attachment unit defined in claim 1 in which said actuating means includes an arm slidably mounted on said web-like member.

3. The attachment unit defined in claim 1 in which said web-like member and said post member are formed integral with one another.

4. The attachment unit defined in claim 1 in which said post member has a hollow configuration.

5. The attachment unit defined in claim 1 in which said post member and the receptacles in the deck of said vehicles have a rectangular cross section so that said post may be supported in one of said deck receptacles in a position such that angular movement thereof is prevented.

6. The attachment unit defined in claim 1 in which said post is mounted at one end of said web-like member and said head is supported at a second end thereof displaced transversely with respect to said post.

7. The attachment unit defined in claim 1, and which includes limiting stop means mounted on the top surface of said web-like member to hold said bracket in each of said plurality of positions.

References Cited
UNITED STATES PATENTS

| | | | |
|---|---|---|---|
| 1,408,414 | 2/1922 | Smith | 105—366 |
| 2,012,040 | 8/1935 | Ellis | 280—179 |
| 2,071,355 | 2/1937 | Norbom | 105—366 |
| 3,159,111 | 12/1964 | Gutridge et al. | 105—366 |
| 3,317,236 | 5/1967 | Connerat et al. | 296—35 |
| 3,343,503 | 9/1967 | Johnson | 105—368 |
| 3,367,615 | 2/1968 | Turpen | 248—361 |
| 3,389,663 | 6/1968 | Gutridge | 105—366 |

DRAYTON E. HOFFMAN, Primary Examiner

U.S. Cl. X.R.

248—361